Apr. 24, 1923.

E. THOMSON

CHAIN LINK WELDING

Filed March 16, 1921

1,452,942

Inventor
Elihu Thomson
By his Attorneys

Patented Apr. 24, 1923.

1,452,942

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

CHAIN-LINK WELDING.

Application filed March 16, 1921. Serial No. 452,665.

*To all whom it may concern:*

Be it known that I, ELIHU THOMSON, a citizen of the United States, and a resident of Swampscott, in the county of Essex and State of Massachusetts, have invented certain new and useful Improvements in Chain-Link Welding, of which the following is a specification.

My invention relates to that class of metal working operations wherein the work is first suitably heated and is subsequently subjected to a forming or heating operation or both and is specially useful in that method of making chains wherein the ends of the link blank, after being heated to the welding or shaping temperature, are quickly shaped to conform to the completed chain link and welded together at their free ends by the application of a suitable die.

My invention consists in heating blanks for the links of a chain or chains by bringing the ends of two U blanks into light contact with one another and passing the current from one blank to the other, separating the same as soon as they are heated to the proper welding and forming temperature and immediately welding the open ends of each U blank together preferably by applying a suitable shaping and welding die to each piece.

By thus heating similar pieces electrically by juxtaposition to one another to the proper forming or welding temperature, separating them and then subjecting them to the desired forming or heating operation or both, not only is energy conserved since it is delivered in like measure to both pieces for the same result but it also becomes possible to so conduct the operation that in the making of chains two chains may be made in a practically continuous and simultaneous operation.

Figure 1:
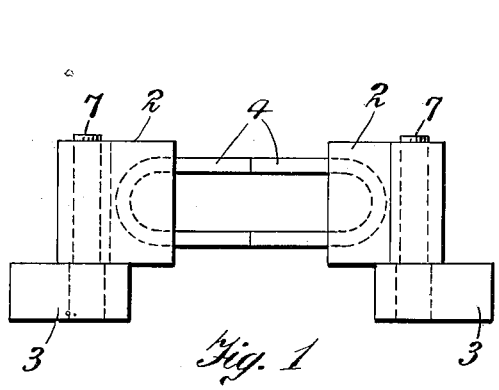
Fig. 1 shows in side view two links being heated at once in suitable heating clamps similar to the clamps of an electric welder.

In the drawings 2 2' indicate respectively the two heating clamps furnished with heating current from any source whereby the heating current may be passed from one to the other and through the blanks secured in them while in contact with one another. In chain constructions these heating clamps may be like those of an electric welder in that they are suitably formed to allow the insertion and withdrawal of the work or pieces of work employed in the operation.

Figure 2:
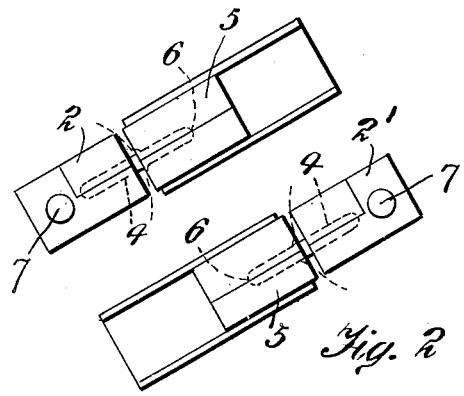
Fig. 2 is a plan showing the heating clamps swung around to allow a welding and forming die to be slipped over each U blank to complete the operation.
Figure 4:
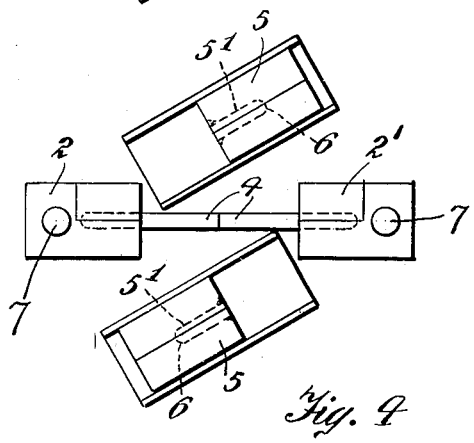
Fig. 4 is a plan of the heating clamps with the work inserted therein.
Figure 5:
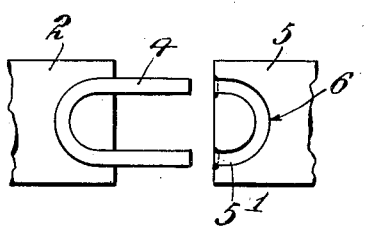
Fig. 5 shows the relation of each U-shaped link to its own forming and heating die just previously to the application of the latter to form and weld the link of one of the chains.

To facilitate the carrying on of my present process, however, the base of the clamp may be suitably pivoted as indicated at 7 upon the terminal 3 through which the current is supplied to the clamps and work. Also, as will be readily understood, one or both heating clamps are movable to and from one another to permit the legs to be moved to and from one another for the step of the process involving the free ends to be formed and welded. This swinging movement upon the pivots for this purpose is indicated in Fig. 2 by the dotted arcs of circles embracing the ends of the heating clamps. During the heating operation the clamps stand in line with one another as seen in Fig. 4.

4 4 indicate two links bent from suitable stock into the U form and being simultaneously heated by contact with one another. This is accomplished by moving the two U's, opposed as shown, so that their free ends will make rather light contact pressure and then passing the heating current from one to the other and in sufficient amount to bring them up to the requisite temperature for the bending of the free ends together and welding the ends to one another by insertion into a forming and welding die, such as indicated at 5. This die is a split die to permit the removal of the formed and welded link and is provided with the groove 5', as shown, by which the ends are bent inwardly and forced against one another at a point 6, when the free ends of the heated link are forced into the die by movement either of the heating clamp or of the die itself.

Figure 3:
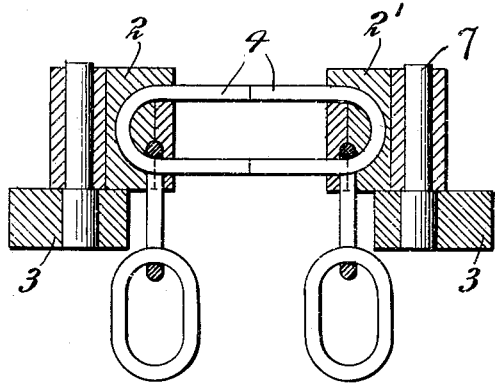
Fig. 3 shows the blanks being heated in the operation of making two chains at once.

It will be understood that as soon as the proper temperature is reached for both links 4, they are quickly separated by a quick movement of one or both heating clamps and are quickly inserted into their respective welding dies 5, thereby completing the forming and welding of both links the two of which have been previously simultaneously heated by contact with one another. To facilitate the operation each of the welding dies 5 may be run in suitable ways or guides at an angle to the line joining the two heating clamps as illustrated in Figs. 2 and 4 and so that, by giving the heating clamps a slight swing, the open ends of the links will be brought into line with the openings in the dies, whereupon the movement of the latter will form and weld the link, the splitting of the die permitting the removal of the formed and welded link. The completed links can hang down from the pivoted heating clamps as indicated in Fig. 3, each completed link hanging in an opening in the face of the clamp while the links being heated are suitably held in grooves or recesses in the heating clamps and clamped therein by any proper separable clamp.

It will be readily understood that the movement provided for the heating clamp or clamps is only sufficient to secure contact for the pieces to be heated and to permit them to be separated. They are not pressed together for welding. For a one-quarter inch rod the ends of the U pieces should be heated about five-eighths of an inch back from their end to permit the motions to be made without cooling of the ends below the welding heat. This however is only a statement of the approximate length and size of bar and would be modified for different cases.

What I claim as my invention is:—

1. The herein described improvement in processes of making chains, consisting in heating the ends of the U blanks for two chains by passing an electric current from one to the other while they are in light contact and immediately thereafter forming and welding the end of each U-shaped blank each in its own welding and forming die.

2. The herein described improvement in chain making, consisting in forming two metal U's each adapted to make a link of a chain, bringing the free ends of said U's into light contact pressure, passing a heating current from one to the other, separating the U's and forcing U-shaped dies, one for each link, on to the open end of the U to complete the shape of the link and weld the free ends of the U together.

3. The herein described improvement in manufacturing endless welded forms of metal, consisting in forming U-shaped blanks, bringing the free ends of two blanks into light contact, heating the ends by passing an electric current from one to the other of the two blanks, separating the blanks and applying to said blanks simultaneously forming and welding dies, one for each blank, adapted to bring the free ends of said blank into contact to weld them to one another.

4. The herein described improvement in process of making two chains at once, consisting in heating the ends of U blanks for the two chains respectively by passing an electric current from one to the other while the ends of the U's are in light contact to bring them to welding temperature and then welding the ends of each U-shaped blank together while threaded through the previously formed link of its own chain.

Signed at Lynn, in the county of Essex and State of Massachusetts, this 20th day of January, A. D. 1921.

ELIHU THOMSON.

Witness:
IRENE LEFKOWITZ.